(12) United States Patent
Boyadjian et al.

(10) Patent No.: US 6,575,374 B1
(45) Date of Patent: Jun. 10, 2003

(54) COUPLING ANTENNA WITH HIGH INDUCTANCE

(75) Inventors: Thierry Boyadjian, Saint Laurent du Var (FR); Christophe Mathieu, Saint Marcel (FR)

(73) Assignee: Ask S.A., Sophia Antipolis (FR)

( * ) Notice: Subject to any disclaimer, the term of this patent is extended or adjusted under 35 U.S.C. 154(b) by 112 days.

(21) Appl. No.: 09/868,776

(22) PCT Filed: Oct. 26, 2000

(86) PCT No.: PCT/FR00/02983

§ 371 (c)(1),
(2), (4) Date: Aug. 8, 2001

(87) PCT Pub. No.: WO01/31731

PCT Pub. Date: May 3, 2001

(30) Foreign Application Priority Data

Oct. 28, 1999 (FR) .............................................. 99 13851

(51) Int. Cl.[7] .............................................. G06R 19/06
(52) U.S. Cl. ........................................ 235/492; 235/380
(58) Field of Search ................................. 235/380, 492

(56) References Cited

U.S. PATENT DOCUMENTS 6,491,230 B1 * 12/2002 Dubost et al. ............... 235/492

FOREIGN PATENT DOCUMENTS

| DE | 44 41 122 | 12/1995 |
| EP | 743 699 | 11/1996 |
| EP | 768 620 | 4/1997 |

* cited by examiner

*Primary Examiner*—Harold I. Pitts
(74) *Attorney, Agent, or Firm*—James C. Lydon

(57) ABSTRACT

A coupling antenna which includes a plurality of turns in series located on a planar support (14) formed by an insulating dielectric substrate. The antenna includes one or several sets of at least one turn (16) located on the planar support, mounted in series, at least one of the sets consisting of at least two spires (16,22) in series superposed along an axis perpendicular to the plane of the support and separated by an insulating strip (20) of dielectric ink, thereby resulting in a high inductance value. The invention also concerns the method for making such an antenna and the use of the antenna in a contactless smart card.

15 Claims, 2 Drawing Sheets

COUPLING ANTENNA WITH HIGH INDUCTANCE

This application is a U.S. National Stage of International application PCT/FR00/02983, filed Oct. 26, 2000 and published on May 3, 2001 in the French Language.

TECHNICAL FIELD

The present invention relates to contactless transceiver systems, and relates particularly to a high inductance coupling antenna especially used in contactless smart cards.

BACKGROUND ART

At present, contactless transceiver systems are widely used in numerous applications. One of these applications is the contactless smart card system which is being increasingly used in various sectors. In the transport sector, such cards have been developed by motorway operators in order to provide users with subscription possibilities and to simplify toll booth payment operations. They have also been developed as a means of payment. This is the case of the electronic wallet, for example. Many companies have also developed identification means for their personnel using contactless smart cards.

The exchange of information between the contactless card and the associated reader is accomplished by remote electromagnetic coupling between an antenna lodged in the contactless card and a second antenna located in the reader. For developing, storing and processing the information, the card is equipped with a chip acting as a memory zone and a microprocessor, which is connected to the antenna. This chip contains an input capacitance provided by capacitors built into the chip. The antenna and the chip are generally located on a flat neutral support. The optimal operation of the antenna-chip coupling, which must not be resistive, is obtained when the following circuit resonance law is observed:

$$LC\omega^2 = 1 \qquad (1)$$

in which L represents the inductance of the antenna, C represents the input capacitance and $\omega$ the pulsation equal to $2\pi f$, in which f represents the normalized frequency (for example, 13.56 MHz).

The obligation to observe this law requires chip manufacturers, also called founders, to integrate capacitors in the chips in order to obtain sufficiently high capacitance values. In this manner, the production cost of the chips is necessarily higher due to the presence of the capacitors.

The development of contactless smart cards inevitably includes reducing the production cost of the chips used in these cards. In order to reduce the cost of the chips, founders have been increasingly led to reduce the number of capacitors built into the chips and to thereby reduce the capacitance of the circuit. In this manner, manufacturers can produce smaller chips.

In order to observe the law $LC\omega^2 = 1$ and to obtain optimal coupling, the inductance L of the antenna must be increased in order to compensate the decrease in the chip's input capacitance value. In the case of antennas made by using copper aluminum etching techniques, in the form of turns on a plastic dielectric support, the inductance is generally increased by augmenting the number of turns. This solution, however, causes several major drawbacks. Indeed, since any electric circuit has a certain resistance, the increase in the number of turns, which essentially corresponds to an increase in the circuit's length, leads to a significant increase in the value of this resistance. This considerably affects the performance characteristics of the antenna and thus also the card. As a result, the reading distance of the card is shortened significantly.

In order to limit the overall dimensions and to maintain the effective area for the electromagnetic flow through the card, the width of the copper tracks must be reduced. As a result, the resistance of the antenna is increased and, above all, the reliability of the cards is downgraded as there is a higher risk of the antenna turns breaking when the card bodies are subjected to the hot lamination operation under pressure.

The unit cost of the engraved antenna increases considerably. Thus, the cost reductions obtained by the founders with chips having a lower input capacity are cancelled out by the supplementary cost of the antennas. Card fabrication and use is thus not more profitable.

SUMMARY OF THE INVENTION

The object of the invention is to offset these disadvantages by providing an antenna with a high inductance for a high performance card, featuring proven reliability and having a production cost, and thus a cost price, which is much lower than that of the smart cards currently available on the market.

The invention relates to a coupling antenna consisting of a plurality of turns in series located on a flat support made up of an insulating dielectric substrate. This antenna includes one or more assemblies of at least one turn located on said flat support, mounted in series, at least one of the assemblies consisting of at least two turns in series, superimposed in relation to an axis perpendicular to the plane of the support and separated by an insulating strip of dielectric ink enabling a high inductance value to be obtained.

In a preferred embodiment of the invention, the coupling antenna includes one or more assemblies of at least one turn of ink screen-printed on the flat support, mounted in series, at least one of the assemblies being made up of least two turns of screen-printed ink, in series, superimposed along an axis perpendicular to an insulating strip of dielectric ink also screen printed on the support.

Another aspect of the invention is the coupling antenna manufacturing process which consists of:

- performing the screen printing of a turn of one or several assemblies by depositing conductive ink on one side of a flat support made up of an insulating dielectric substrate,
- performing the screen printing of an insulating strip superimposed on the screen printing of the turn of at least one assembly, by means of a dielectric ink depositing operation, enabling the turn to be covered and to leave the antenna's bonding pads visible and the connecting zones of the turns superimposed,
- performing the screen printing of a turn of at least one assembly, superimposed on the screen printing of the insulating strip by depositing conductive ink,
  the second and third steps of the process being repeated one or more times when the antenna features one or more assemblies of more than two superimposed turns.

This antenna and its manufacturing process present many advantages:

a) In order to compensate the higher intrinsic electrical resistivity of screen-printable conductive polymer inks, the cross-section of the antenna's turns must be increased. This is achieved by widening the turns and/or making a thick deposit of ink. On the basis of these design adaptations, the instantaneous performance characteristics of the screen-printed antenna having less than three turns are at least comparable to those of an engraved antenna and even better after the various mechanical and ageing tests (damp heat). When the inductance of the antenna must be increased in order to match a chip having low internal capacitance, increasing the number of turns is detrimental to the screen-printed antenna as the electrical properties are quickly downgraded above three turns (loss of electrical conductivity and leveling off of the inductance). The inventive process allows this technological dead end to be overcome by offering a screen-printed antenna which is compatible with low-capacitance chips.

b) By modifying the geometric parameters of the coupling antenna according to the invention (thickness of the dielectric insulating layer, width and thickness of the turns, overlapping surface area between superimposed turns), it is possible to adjust the inductance value of the screen-printed antenna in order to obtain perfect matching. An antenna configuration can thus be made which allows the founder to significantly reduce the chip's input capacitance. This "externalization" of the capacitance offers very interesting cost reduction prospects for founders.

c) The cost of a screen-printed antenna is practically ten times less than that of an engraved antenna. The implementation of the screen printing of an antenna takes place in accordance with a standard procedure in relation to an antenna screen-printed in the plane (three films, three screens, the same inks). The overall cost of the card is thus much lower as the internal capacitance of the chip has dropped significantly.

BRIEF DESCRIPTION OF THE DRAWINGS

The objects, characteristics and advantages of the invention will become more apparent from the following description when taken in conjunction with the accompanying drawings in which.

DETAILED DESCRIPTION OF THE INVENTION

Figure 1:
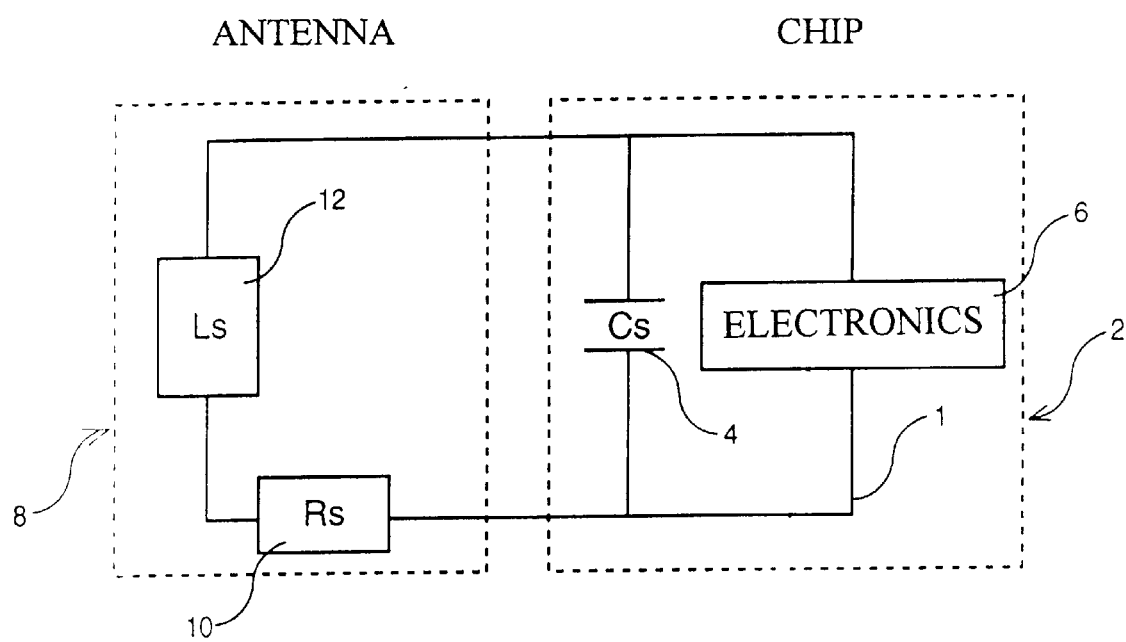
FIG. 1 represents the circuit diagram of a contactless smart card.

According to FIG. 1, the electric circuit of card 1 is divided into two components: the antenna and the chip. The chip 2 has an internal capacitance Cs 4 obtained via capacitors located in the chip. It also has an electronic part 6 corresponding to the memory zone and the processor. The chip 2 is connected to the antenna 8 via the circuit 1. The antenna 8 has a resistance Rs 10 which causes the circuit to loose power. The antenna also has a self-inductance Ls 12.

Figure 2:
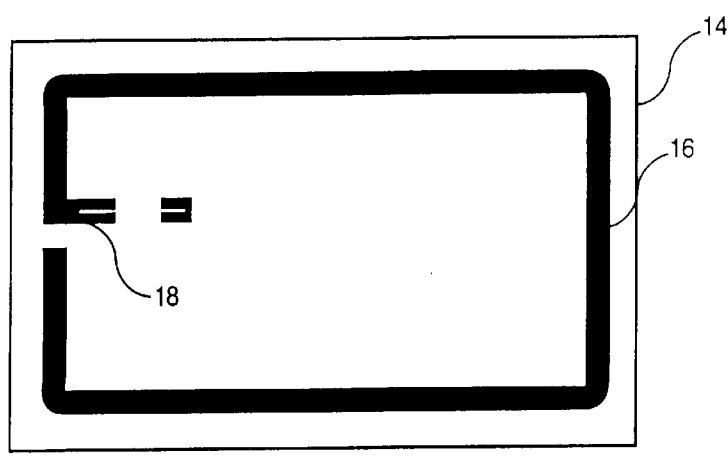
FIG. 2 represents the coupling antenna according to a special embodiment, at the end of this first fabrication step.
Figure 3:
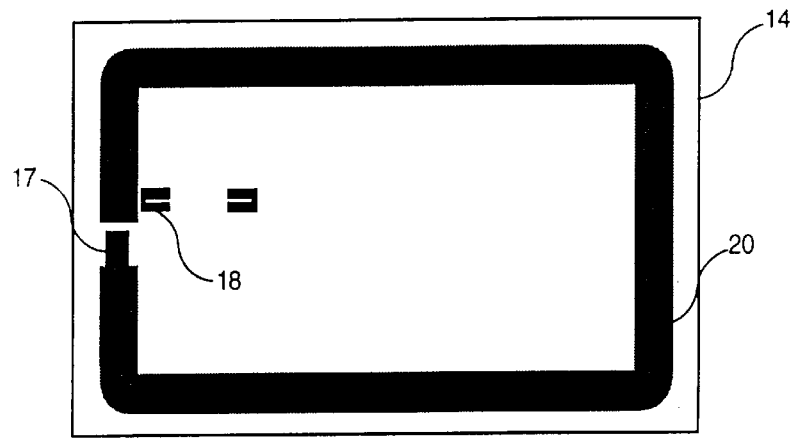
FIG. 3 represents the coupling antenna according to the invention, at the end of this second fabrication step.
Figure 4:
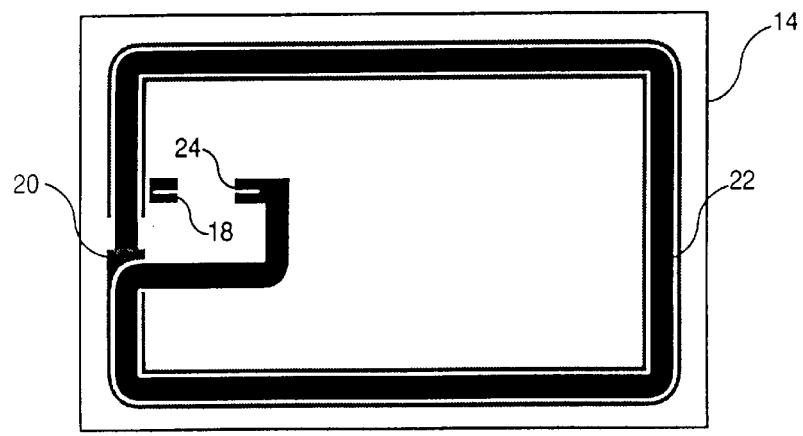
FIG. 4 represents the coupling antenna according to the invention, at the end of this last fabrication step.

FIGS. 2, 3 and 4 represent the antenna after the three main fabrication steps. It consists of an antenna with an assembly of two superimposed turns. The same process may be used to make an antenna with several assemblies of at least one turn and of which at least one of the assemblies consists of at least two superimposed turns.

During the first step of the fabrication process, turn 16, made of conductive ink, was screen printed on the flat support 14 consisting of an insulating dielectric substrate, as shown in FIG. 2. This dielectric substrate is made of plastic, paper or glass fabric impregnated in thermosetting or U.V. shrink type resin. The plastic material used is, for example, polyvinyl chloride (PVC), polyester (PET, PETG), polycarbonate (PC), or acrylonitrile-butadiene-styrene (ABS). The conductive ink used contains polymers and is loaded with conductive elements which may be metals. Preferably, the ink used is loaded with silver. However, it may also be loaded with copper or carbon. The ink contains between 50% an 70% silver in the form of beads or strips. The polymers used are polyesters or acrylic resins. The ink also contains a solvent which is used as a vehicle. According to a specific embodiment, the solvent is a glycol ether. The turn 16 follows the contours of the support. One of its extremities is in contact with one of the bonding pads 18 enabling the antenna to be connected to an electrical or electronic component such as a chip. The other end of the turn is free so that it can be connected to the second turn.

FIG. 3 shows the antenna after the second step of its fabrication process. A second screen printing operation is performed. This second screen printing operation corresponds to the deposit of at least two layers of dielectric ink forming an insulating strip 20 between the two turns. According to a preferred embodiment, each layer is 25 microns thick. This ink contains polymers and cross-links when subjected to U.V. radiation. According to the embodiment, the polymers may be acrylate resins or unsaturated polyesters. Contrary to the conductive ink of the turns, this ink does not contain solvent. The polymers contained in the ink will cross-link when the ink is subjected to U.V. radiation. This cross-linking causes the ink to harden. In this manner, the geometry of the antenna is very stable and especially the thickness of this insulating strip and thus the distance between the two turns does not vary, which allows the antenna to retain its optimal operating characteristics. In order to be sufficiently insulating, this ink must have the highest possible relative permittivity. The value of the permittivity is generally greater than 3. In a preferred embodiment of the coupling antenna according to the invention, the permittivity of the ink used to screen print the insulating strip is 3.9. In order to provide the strip with good insulating characteristics, at least two layers of ink are required. In fact, after cross-linking, the layer of ink is highly porous which prevents it from having high insulating properties. In order to solve this problem, two successive and superimposed layers are screen printed and form a strip having high insulating properties. This strip is superimposed on turn 16 and entirely covers the latter and particularly the end which is in contact with one of the antenna's bonding pads 18, with the exception of the second end 17 which is left free in order to be able to connect the two turns together.

FIG. 4 shows the antenna completed after the third and last step of its fabrication process. A third screen printing operation corresponding to the turn 22 was conducted. It is superimposed over turn 16 of the first assembly and over the insulating strip 20 which is between the two turns, along an axis which is perpendicular to the plane of the support 14. One of the ends of this turn 22 is connected to the free end 17 of the first turn 16. The second end of the turn 22 is connected to the antenna's second bonding pad 24.

It can thus be noted that, in this example, the antenna is made up of two turns in series, which are in two different and parallel planes, each being parallel to the support 14. In this manner, an antenna of this type is called a "Z" type antenna.

It can be considered that the two turns which make up the antenna are connected together by capacitors distributed throughout the antenna. This structure is equivalent to two coils (corresponding to each of the turns) connected in series through a capacitor formed by the dielectric which makes up the insulating strip between the two turns. If L is the inductance of each of the turns and C is the value of this capacitance, the complex impedance of the assembly is thus:

$$Z = i \cdot 2 \cdot L \cdot \omega - \frac{i}{C \cdot \omega} \qquad (2)$$

The equation above shows that the more the value of the capacitance C is increased, the more the impedance Z increases. The capacitance between two superimposed turns varies according to the thickness of the insulating strip. It is thus possible to vary the antenna's apparent inductance (the impedance Z, in fact) considering the value of the chip's input capacitance, to obtain the resonance condition. Indeed, if the input capacitance of the chip is very low, the capacitance between the two turns is increased by decreasing the thickness of the insulating strip. The apparent inductance of the antenna thus also increases. If, however, the chip's input capacitance is higher, a less inductive antenna—thus better adapted to the chip—is obtained, by increasing the thickness of the insulating strip. In this manner, it is possible to obtain an apparent inductance value which is variable depending on the thickness of the insulating strip separating the superimposed turns.

Capacitance values between the two turns were measured and the maximum value recorded is 2,000 picofahrads (pF). This capacitance allowed an inductance value of approximately 1,900 nanohenrys (nH) to be obtained.

The coupling antenna described above is only an example of an embodiment. According to the invention, the antennas may have one or more assemblies of one single turn and one or more assemblies of multiple turns mounted in series. Each assembly of several turns being made up of superimposed turns in series, the number and the diameter of turns varying from one assembly to another.

The coupling antenna according to the invention may particularly be used in contactless smart cards. These cards consist of a flat support featuring at least one high inductance coupling antenna connected to at least one chip, also located on the flat support, having low internal capacitance. According to a specific type of contactless smart card, the flat support is inserted between two card bodies, said card bodies being fixed at each side of said flat support in order to stiffen it. These card bodies may be made of plastic. In this case, the plastic used may be polyvinyl chloride (PVC), polyester (PET, PETG), polycarbonate (PC), or acrylonitrile-butadiene-styrene (ABS). When the card bodies are plastic, their fixation on each side of the flat support bearing on one or more antennas according to the invention, is made by hot or cold pressing of the three elements which make up the card, also referred to as hot or cold lamination. Once this lamination step has been performed, the chip is installed and connected to the card's antenna(s).

What is claimed is:

1. A coupling antenna comprising a plurality of turns in series located on a flat support made up of an insulating dielectric substrate; wherein said antenna includes one or more assemblies of at least one turn located on said flat support, mounted in series, at least one of the assemblies consisting of at least two turns mounted in series, and superimposed along an axis perpendicular to the plane of said support and separated by an insulating strip of dielectric ink, which allows it to obtain a high inductance value.

2. The coupling antenna of claim 1, wherein said turns are turns of ink screen printed on said flat support and said insulating strip of dielectric ink is also screen printed on said flat support.

3. The coupling antenna of claim 2, having an assembly of two turns of screen printed ink, in series, superimposed along an axis perpendicular to the plane of said support and separated by said insulating strip.

4. The coupling antenna of claim 1, wherein the dielectric substrate forming the flat support is made of a member selected from the group consisting of a plastic material, paper or glass fabric impregnated with thermosetting or U.V. shrink resin.

5. The coupling antenna of claim 4, wherein a plastic material is used as the dielectric substrate for making up the flat support, and said plastic material is selected from the group consisting of polyvinyl chloride (PVC), polyester (PET, PETG), polycarbonate (PC) and acrylonitrile-butadiene-styrene (ABS).

6. The coupling antenna of claim 2, wherein said ink of said screen-printed turns is a conductive polymer ink loaded with conductive elements.

7. The coupling antenna of claim 6, wherein said conductive polymer ink contains at least one member selected from the group consisting of silver, copper and carbon.

8. The coupling antenna of claim 1, wherein said insulating band is made up of at least two layers of dielectric ink.

9. The coupling antenna of claim 8, wherein the dielectric ink forming the two layers of the insulating strip is a U.V. shrink type polymer ink.

10. A fabrication process comprising:
   performing screen printing of a turn from one or several assemblies by depositing conductive ink on one side of a flat support made up of an insulating dielectric substrate,
   performing the screen printing of an insulating strip superimposed on the screen printing of the turn of at least one assembly, by a dielectric ink depositing operation, enabling the turn to be covered and to leave the antenna's connection bonding pads and the connecting zones of the superimposed turns visible,
   performing the screen printing of a turn of at least one assembly, superimposed on the screen printing of the insulating strip by depositing conductive ink, the second and third steps of the process being repeated one or more times when the antenna features one or more assemblies of more than two superimposed turns.

11. A contactless smart card made up of a flat support featuring at least one high inductance coupling antenna according to claim 1, connected to at least one chip.

12. The contactless smart card of claim 11, wherein at least one chip has a low internal capacitance.

13. The contactless smart card of claim 11, wherein the flat support is inserted between two card bodies, said card bodies being fixed to each side of said flat support, enabling the card to be stiffened.

14. The contactless smart card of claim 13, wherein the card body is a plastic material selected from the group consisting of polyvinyl chloride (PVC), polyester (PET, PETG), polycarbonate (PC) and acrylonitrile-butadiene-styrene (ABS).

15. The contactless smart card of claim 11, wherein the card body is fixed to the flat support of the antenna by hot or cold lamination.

* * * * *